Feb. 9, 1971  R. J. WEBER  3,561,874
LASER DISCRIMINATOR AND METHOD
Filed Dec. 18, 1967
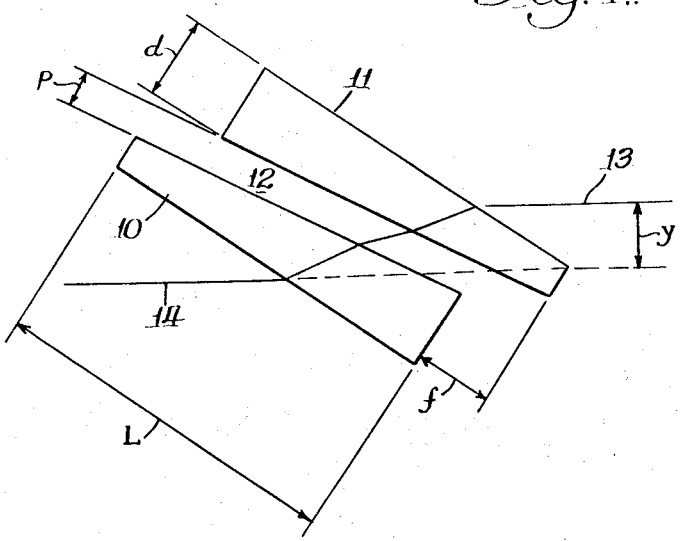
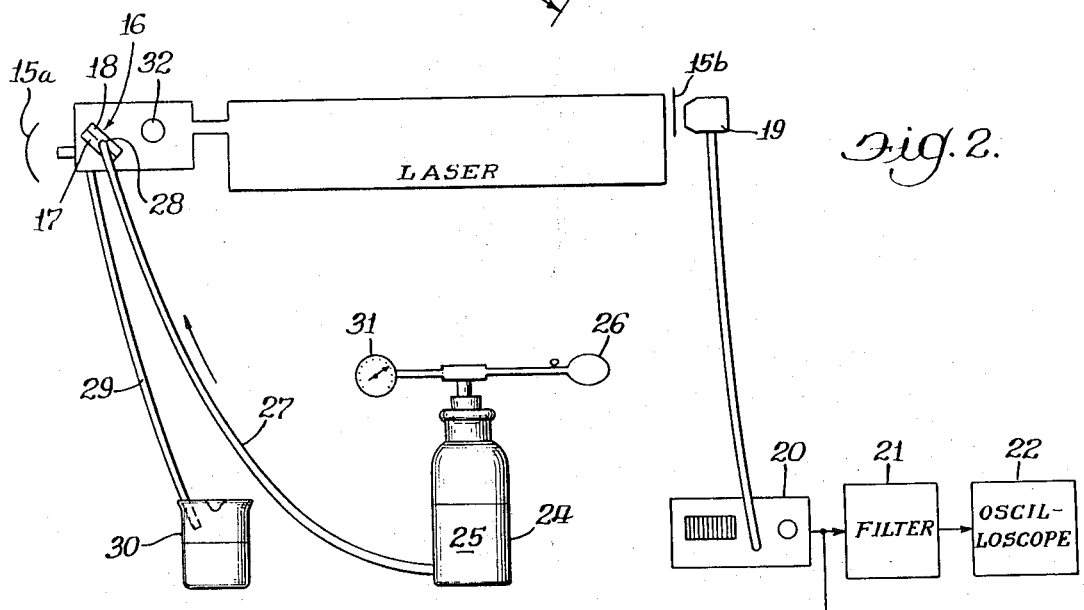
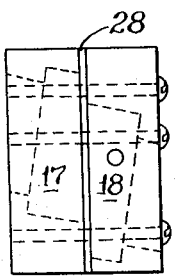
INVENTOR.
Robert J. Weber
BY
Dawson, Tilton, Fallon & Lungmus
Attys.

United States Patent Office 3,561,874
Patented Feb. 9, 1971

3,561,874
LASER DISCRIMINATOR AND METHOD
Robert J. Weber, Marion, Iowa, assignor to Iowa State University Research Foundation, Inc., Ames, Iowa, a corporation of Iowa
Filed Dec. 18, 1967, Ser. No. 691,312
Int. Cl. G01n 21/00, 21/48
U.S. Cl. 356—102         7 Claims

ABSTRACT OF THE DISCLOSURE

A laser is used to determine the size of small particles or other objects. The particles are introduced into the electromagnetic cavity of the laser in an aqueous medium flowing through a channel which intersects with the laser beam. The channel is defined in a quartz housing, and it is oriented relative to the adjacent quartz windows at the Brewster angle to insure complete transmission of the light. A light power meter monitors the laser output and converts it to an electrical signal representative of the intensity of the laser beam. As incident light strikes the particles, the total scatter will depend upon the size of the particles, and a change will be reflected in the laser output due to the gain characteristics of the laser. The change in laser power bears a one-to-one correlation with particle scattering cross section.

BACKGROUND

The present invention relates to apparatus for determining the size of small particles; more particularly, it relates to a particle discriminator using a laser.

There have been many attempts to measure the size of particles in the sub-sieve region, that is, particles having a cross section of less than about 100 microns. One suggested system is limited to the concept of determining particle size of emulsions and suspensions. In this sytem, particles of uniform size are passed before a source of infrared light and the absorption of light by the particles in specific absorption bands is measured to determine particle size.

One prior system in which a laser is employed depends upon the sedimentation or settling of very small particles in a viscous medium. The falling particles reach the limiting velocity in a short time relative to the total fall time, and a laser is used to detect and measure the fall time over a predetermined distance. The fall time is related to particle size according to the well-known Stokes equation.

Most prior systems depend upon the use of particles of uniform size and the use of a relatively large number of particles. As will be obvious from the detailed description set forth below, the present invention is not so limited.

SUMMARY

The present system provides for introducing a particle of unknown size into the electromagnetic cavity of an oscillating laser having sufficient gain to overcome the insertion loss. There are no restrictions on the size of the particle other than that it be small compared to the cross section of the laser beam and that it not quench oscillation. The active medium of the laser may be a gas tube, a solid material or a liquid material; and it should exhibit sufficient gain to overcome the losses incurred in the medium and in scattering from the particle. The larger the gain of the laser, the more sensitive will the system be since a very small incremental loss can more easily be detected.

The particles, in an aqueous medium, are introduced into the electromagnetic cavity of the laser by means of a channel or conduit which intersects the beam. The channel through which the medium flows is arranged so that light is transmitted through the medium without reflection. A light power meter monitors the laser output and converts it to an electrical signal representative of the intensity of the laser beam. As light strikes a particle, the total light lost (hereinafter referred to as total scattering which includes both absorption and actual reflective scattering) is a function of the particle size. The loss introduced into the laser amplification system will be reflected in the power output of the laser; and the power meter will generate a voltage representative of particle size. This output voltage may be fed to an oscilloscope or other means for measuring its amplitude, or it may be fed to a digital counter if the system is used to count particles.

The particle, as contemplated by the present invention, does not have to be lossy, as is required in most prior art systems. The present system will determine particle size for both lossy and loss-free particles. In addition, the particle may be organic or inorganic, and it may be dead or alive. The wavelength of the electromagnetic wave is also not important as long as it is known and suitable compensation is made, as described within. The wavelength of the light should preferably be small with respect to the particle size for I have found that in this case, total scattering is independent of the amount of light absorbed by the particle and depends only on its size. Further, the concept of the present system may be applied to apparatus for sizing things other than particles, for instance, very fine wire.

Other features and advantages of the present invention will be obvious to persons skilled in the art from the following detailed description of a preferred embodiment accompanied by the attached drawing.

DRAWING

FIG. 1 is a diagrammatic illustration of the offset of the laser light beam caused by Brewster angle windows providing a channel for the particles in the laser cavity;

FIG. 2 is a diagrammatic illustration of a system used for particle size determination according to the present invention; and FIG. 3 is a detailed side view of an assembled cubette for mounting the Brewster angle windows.

THEORY OF OPERATION

Before describing in detail a preferred embodiment of the present invention, certain theoretical considerations should be understood in order to facilitate understanding of the principle of operation of my invention. One important consideration in the inventive system is that the overall loss in the transmission path of the light be kept at a minimum. One reason for this is that the laser must operate with sufficient gain to overcome the light which is scattered and absorbed by the particles. If the total scattering caused by the particle and the system loss cannot be overcome by the gain of the laser, then the laser will be quenched and cease to operate.

A preferred method for minimizing losses at the interface between the medium transporting the particles and the electromagnetic cavity of the laser is referred to herein as a Brewster angle cubette.

The term "Brewster angle" refers to the angle at which an electromagnetic field polarized in the plane of incidence can propagate across the interface between two optically different media without reflection. If the materials are non-magnetic, there is no angle at which an electric field polarized perpendicular to the plane of incidence will be completely transmitted. Brewster angle windows have been inserted in laser cavities in order to allow lossless interface with mirrors external the electromagnetic cavity. The light from a laser passing through a Brewster angle window is polarized. In the present invention, Brewster angle windows are used to provide a loss-free interface when introducing the medium transporting the particles to be measured into the electromagnetic cavity of the laser.

The optical theory for determining the Brewster angle is well known, and additional information may be obtained from the references compiled in the bibliography of my dissertation submitted in June 1967 to the graduate faculty of Iowa State University of Science and Technology, Ames, Iowa, entitled Coherent Light Scattering from Biological Bodies in an Aqueous Medium. For an air-to-silica interface and a light wavelength of 6328 A., the Brewster angle is about 55.5°. For a silica-to-water interface at this same wave length, the Brewster angle is about 42.4°. The angle between the two faces of the window, allowing Brewster angle transmission from air-to-silica-to-water is about 7.96°.

As illustrated in FIG. 1, two identical windows 10 and 11 may be placed back-to-back with water, generally denoted by reference numeral 12, between them; and there will be no interfacial reflections. However, the exiting light ray, diagrammatically illustrated by the straight line 13 will be parallel to, but offset from the incident ray 14 by an amount designated $y$ in the drawing. The value of the offset $y$ for an air-to-silica-to-water-to-silica-to-air transition is given approximately as follows:

$$y=-0.061L+0.874d+1.053p+0.061f \qquad (1)$$

where L is the length of a given window; $d$ is the width of the base of a window; $p$ is the separation between opposing faces of the two windows; and $f$ is the offset of one window relative to the other.

For the case of $L=1$ and $d=0.375$ inch, the equation reduces to $y=0.267+1.053p+0.061f$. The values $p$ and $f$ are chosen for a particular application with the knowledge that $f$ is chosen approximately equal to the value of the offset so that a ray can enter and exit in approximately the center of the windows.

With the introduction of the Brewster angle windows (sometimes referred to as a cubette) into the oscillatory cavity, the laser cavity will be misaligned. If one plane mirror is used in the laser system, the problem of the offset is not as bad as when both mirrors are spherical. A simplified procedure for aligning the mirrors intersecting the laser beam is described in more detail within.

In my above-identified dissertation, I have analyzed the equations which describe the electromagnetic cavity in a laser to determine the change in the output of the laser caused by the introduction of a small particle into the cavity. The energy lost per pass from a wave front was determined, and this allowed the determination of the change in the output of a laser when the gain equation and scattering cross section of the particle are known. One important result of my analysis of the cavity with a small perturbation introduced into it is that the total scattering cross section (which includes both the absorption cross section and the actual scattering cross section) is about twice the geometric cross section of a spherical particle provided the wave length of the light is small with respect to the particle size; and this is true regardless of the size or the type of losses in the particle. Hence, under these conditions a total scattering cross section has a one-to-one correlation with the size of the particle and if the change in output of the laser is measured for a given particle, and the gain characteristics of the laser are known, the total scattering cross section can also be determined.

PREFERRED EMBODIMENT

Referring now to FIG. 2, a laser is generally designated by reference numeral 15 having a spherical mirror **15*a* at one end and a plane mirror 15*b* at the other. A cubette is designated by reference numeral 16. Brewster angle windows 17 and 18 are mounted in the cubette 16** by means of holder which is shown in more detail in FIG. 3.

A power meter head 19 monitors the laser output and energizes a power meter 20. The power meter head 19 is preferably a conventional high-speed optical diode, which generates an output voltage proportional to the intensity of the incident light. The mirror **15*b* has less than 100% reflectivity. The output signal of the power meter is fed through a filter 21 to an oscilloscope 22 for measuring. The same signal also may be fed to a counter 23**.

A pressure bottle 24 contains a suitable medium 25 for supporting the particles to be measured; and the top of the bottle 24 is sealed. A pressure bulb 26 is squeezed to generate pressure within the bottle 24 to force the liquid through a first conduit 27 and into a channel 28 defined between the two Brewster windows 17 and 18.

After traveling between the Brewster windows 17 and 18 through the channel 28, the solution is returned through a conduit 29 to a beaker 30. It will be obvious that a closed system would produce similar results. A pressure gauge 31 monitors the pressure within the bottle 24.

It is preferred that the laser 15 be operated in its lowest order mode, with all higher order modes below their threshold value. That is, the lowest order mode is the only mode of oscillation which regenerates itself, and all other modes are damped so as to be non-oscillatory. Thus, any energy initially generated in the higher order modes will be lost from the cavity and no sustained oscillation in such modes will occur.

A quasi-static gain equation is used to describe the operation of the laser as follows:

$$\frac{I}{I_o}=\frac{1-\alpha/\alpha_m}{1+\alpha/\alpha_1} \qquad (2)$$

where I is the output of the laser for a given inserted loss, $I_o$ is the undisturbed laser output, $\alpha$ is the value of the loss inserted, $\alpha_1$ is the value of the loss for an output of $I_o$, and $\alpha_m$ is the maximum value of a loss which can be inserted without damping the oscillation.

In my dissertation, I have derived an equation for calculating the loss per pass, and herein have repeated certain results of my analysis which enables one to calculate the energy loss from a laser cavity in conjunction with Equation 2 above. The total loss per round trip is twice the loss for a single pass, and the total loss in percent for one round trip may be expressed as follows:

For spherical particles:

$$\text{loss}=400\cdot\frac{Q^{(t)}r^2}{w_o^2}\exp\left[-2(x_s^2+y_s^2)/w_o^2\right]\% \qquad (3)$$

For nonspherical particles:

$$\text{loss}=400\,\frac{Q^{(t)}D}{\pi w_o^2}\exp\left[-2(x_s^2+y_s^2)/w_o^2\right]\%$$

For large particles with $Q^{(t)}=2$:

$$\text{loss}=800\,\frac{D}{\pi w_o^2}\exp\left[-2(x_s^2+y_s^2)/w_o^2\right]\%$$

In the above equations:

$Q^{(t)}$ is the total scattering cross section of the particle; $w_o$ is the beam spot size at the particle;

$r$ is the effective radius of the scattering particle;

$x_s$ is the horizontal coordinate of the particle relative to the center of the beam;

$y_s$ is the vertical coordinate of the particle relative to the center of the beam;

D is the cross section area of the scattering particle; and $\pi=3.14159$.

By obtaining the electric field profile in the region of the cavity, one will know how to position a particle for maximum sensitivity. This is especially helpful in measuring very small particles. Results indicate that the use of a flat mirror will enable one to obtain a very narrow beam and thus increase greatly the sensitivity of the cavity. As I have demonstrated in the above-identified dissertation, sensitivity is related to the reciprocal of the spot size. The energy lost in the original mode is proportional to the absolute scattering cross section of the particle and inversely proportional to the square of the beam radius. Curves are then plotted for the output change of the laser caused by particular perturbing particles for various values of beam diameter. The output of the laser will depend upon the magnitude of the total scattering cross section of the particles.

As I have shown, the output curve of the laser due to scattering from particles is dependent upon the value of this total scattering cross section, and there is a one-to-one correspondence between the two. Hence, the laser provides a practical method of measuring effective cross sections of irregular particles for a particular orientation of the particles in the beam. It has been found that if the cavity has about 90% of the maximum allowable loss in it, the gain versus loss curve is nearly linear, while a cavity with a relatively low percentage of loss has a highly non-linear gain curve. Once the output versus scattering cross section curve is drawn, readings on the oscilloscope 22 may be made directly, and the amplitude of the readings, once calibrated, is a direct representation of the scattering cross section, and thus the size, of the particles. For a small constant loss, the absolute change in output will be greater in the low loss case, but the relative change in loss is greater in the high loss case. Thus, if one is interested in introducing a very small loss in the recording of a large relative output, it is better to work with a high loss in the system. The higher loss can easily be introduced with a variable angle flat introduced as at 32 in FIG. 2 at approximately the Brewster angle.

For a constant speed of a particle through the cubette, the output pulse length is related to the geometrical size of the particle in one dimension; and since the output height is a measure of the geometrical cross section of the particle, shape as well as size information may be determined from the data received from the laser. For uniform particles, these two bits of information could be cross-correlated to decrease the number of detection errors.

ALIGNMENT PROCEDURE

Before the variable gain flat is inserted into the laser in the hole 32, the front mirror 15a of the laser is aligned with another laser. The object is to cause the spot reflected from the front mirror to reflect back into the spot on the mirror used with the aligning laser. This permits a light to pass through the laser tube in correct alignment because the mirror on the front end has not been altered from an oscillating configuration. Next, a microscope cover slide is positioned vertically within the aperture provided for the variable Brewster angle flat. The surface of this flat is deliberately made glossy in order to reflect light from its surface. The light reflected from the back mirror is visible as is the light transmitted through the laser tube. The two spots are mated by adjusting screws provided on the adapter. Adjustment is made until the laser begins to amplify.

Another important operational consideration is that the pressure required to pump the particles through the cubette should not be so great as to cause the water or other transporting medium to swirl within the cubette. Cubette design, of course, is important to prevent such turbulence and it could be designed to allow greater flow velocities than were used herein.

DETERMINATION OF PARTICLE VELOCITY

It is desirable to calculate the velocity at which a particle traverses the beam, as well as to calculate the position at which a particle traverses the beam so as to resolve the ambiguity between a small particle in the center of the beam and a large particle traversing the edge of the beam.

As has already been explained, for any given loss, one can calculate the output; and likewise for any given output, one can calculate the inserted loss. Thus, for any particular particle, it is possible to determine the portion of the beam through which the particle passed, knowing the beam shape or profile. The following equation is for a beam which has mode structure.

$$I = \alpha^2 \exp(-2a^2(x^2 + y^2)) \quad (4)$$

where I is intensity, $\alpha$ is the square root of the maximum intensity through which the particle passes; $a$ is the reciprocal of $w_o$, the spot size, $x$ is the horizontal position relative to the center of the beam, and $y$ is the vertical coordinate of the beam profile relative to the center. This analysis is based solely on intensity, but due to the one-to-one correspondence between intensity and output, the output of the power meter could also be used if it were properly generated, as with diode function generators, etc.

A convention is made that the particle travels parallel to the $y$ axis, and when the particle crosses the $x$ axis at $x_o$, the intensity through which the particle passes is:

$$I = \alpha^2 \exp(-2a^2(x_o^2 + y^2)) \quad (5)$$

and the maximum measured intensity is:

$$I_{max} = \alpha^2 \exp(-2a^2 x_o^2) \quad (6)$$

If the time is now measured for the particle to travel a short distance to the point where the intensity is equal to $\delta I_{max}$ from the $x$ axis where $y=0$, and the velocity is designated by $v$, then:

$$\delta I_{max} = \alpha^2 \exp(-2a^2(x_o^2 + v^2 t_\delta^2)) \quad (7)$$

and $$\ln(\delta I_{max}) = 2\ln\alpha - 2a^2 x_o^2 - 2a^2 v^2 t_\delta^2 \quad (8)$$

or $$\ln\delta = -2a^2 v^2 t_\delta^2 \quad (9)$$

Since $\delta$, $a$, and $t_\delta$ are known, the velocity is uniquely determined.

Now if the time is measured for the particle to travel between the $\beta\alpha^2$ points of the intensity profile, then:

$$\beta\alpha^2 = \alpha^2 \exp[-2a^2(x_o^2 + y^2)] \quad (10)$$

and $$\ln\beta = -2a^2 x_o^2 - 2a^2 v^2 t_\beta^2 \quad (11)$$

Since the velocity is known from the previous measurement, and $a$ and $t_\beta$ are also known, $x_o$ may now be determined. Therefore, through the intensity formula, it is possible to correct for the position at which the particle passes through the beam of the laser particle discriminator.

The derivation of the particle velocity is valid for a particle of any unknown size anywhere in the beam, while the derivation for particle position is valid for a particular particle size for the lowest order mode. Other modes which are not redundant in the $x$ and $y$ direction allow calculation of particle position independent of the knowledge of particle size. The knowledge of the relation between particle size, particle position, and pulse height for this mode though allow a known statistical correction to be applied to the data. In other systems which do not have such well-defined intensity variations, this correction is more difficult to apply.

The ambiguity of particle size and scattering cross section for particles having a cross section which varies rapidly with wavelength may be obviated by using two different wavelengths—either simultaneously or sequentially.

Using the inventive system with two spherical mirrors defining the cavity, I have been able to size particles of the order of 2–4 microns up to 25 microns. The range could be extended with different mirrors. I have detected particles of the order of one-quarter to one-half microns, and these objects could be sized with proper mirrors.

OTHER APPLICATIONS

Although the particular system described in detail above was adapted for counting particles or for measuring the scattering cross section of particles to determine their size, it will be appreciated that the inventive principle has application whenever it is desired to accurately measure very small absolute dimension. For example the apparatus might be used to monitor cultures in a closed system including a pump for circulating the culture and medium from a culture cell through the laser cavity and back to the cell.

The system has also been used to determine the size of very fine wire. In this case, loss formulas, similar to those described above, were derived for sizing the wire (metal or otherwise) which intersect the beam. It could be used to determine deviation of the size of a fine wire being formed and feed back error information for correction. It should also be mentioned that this system will work as well for particles with a refractive index less than one as well as greater than one with respect to the medium. Air bubbles in water for instance, though almost invisible to the eye, are detected easily with this system after they were introduced by rapid stirring of the water.

Having thus described in detail a preferred embodiment of my invention, it will be obvious to persons skilled in the art that certain substitutions may be made for those elements which were described while continuing to practice the principle of the invention; and it is, therefore, intended that all such modifications and substitutions be covered as they are embraced within the spirit and scope of the appended claims.

What is claimed is:

1. Apparatus for determining the size of objects comprising: light source means including laser means having an electromagnetic cavity for generating a beam of coherent light; means coupled to said laser means for introducing objects into the electromagnetic cavity thereof so that the introduced objects intersect said beam of coherent light; means for introducing a predetermined known loss into the cavity to obtain a gain vs. loss characteristic with a one-to-one correspondence between inserted losses and system gain; sensor means for sensing the intensity of the beam and for generating a signal representative of the change in intensity when a particle of unknown size is introduced into the cavity, said signal being directly related to the scattering cross section of a particle of unknown size and, thereby, defining its size; and utilization means responsive to said signal for utilizing said signal.

2. The apparatus of claim 1 wherein said objects are particles which scatter light as they pass through said laser beam, said generated signal being representative of the total scattering cross section of said particles.

3. The apparatus of claim 1 characterized by the fact that said laser has sufficient gain to overcome losses in the system and losses caused by the introduction of said particles whereby the small perturbations in the laser cavity caused by the introduction of said particles will be reflected by a much greater change in the intensity of said laser beam.

4. The apparatus of claim 1 wherein said particle introducing means comprises first and second Brewster angle windows intersecting said beam; and channel-defining means between said Brewster angle windows for containing the medium supporting said particles whereby said beam will traverse said Brewster angle windows and said medium without reflection.

5. The apparatus of claim 1 characterized by the fact that the wave length of the coherent light is small relative to the size of the particles being measured whereby the total scattering cross section of the particles is relatively independent of light absorbed by them.

6. The apparatus of claim 1 wherein the total optical loss of the system is about 90% of the loss necessary to quench oscillation whereby the relation between inserted loss and laser power change is linear.

7. A method of determining the size of particles comprising: introducing the particles into the electromagnetic cavity of an oscillating laser to intersect its beam, deriving a loss characteristic for a laser system for individual particles, sensing the change in intensity in the laser beam caused by the introduction of said particles and correlating the change in laser beam intensity with the loss characteristic of the system to determine the size of the particles.

No references cited.

RONALD L. WIBERT, Primary Examiner
R. J. WEBSTER, Assistant Examiner

U.S. Cl. X.R.

356—103, 208, 209; 250—218; 73—429; 331—94.5